US008271429B2

(12) United States Patent  
Ghuneim et al.

(10) Patent No.: US 8,271,429 B2
(45) Date of Patent: Sep. 18, 2012

(54) SYSTEM AND METHOD FOR COLLECTING AND PROCESSING DATA

(75) Inventors: Mark D. Ghuneim, Southold, NY (US); Matthew R. Dennebaum, New York, NY (US); Dustin J. Norlander, Mercer Island, WA (US)

(73) Assignee: Wiredset LLC, New York, NY (US)

( * ) Notice: Subject to any disclaimer, the term of this patent is extended or adjusted under 35 U.S.C. 154(b) by 868 days.

(21) Appl. No.: 11/900,432

(22) Filed: Sep. 11, 2007

(65) Prior Publication Data
US 2008/0071796 A1    Mar. 20, 2008

Related U.S. Application Data

(60) Provisional application No. 60/843,938, filed on Sep. 11, 2006.

(51) Int. Cl.
*G06F 17/30* (2006.01)
(52) U.S. Cl. ........................................ 707/602
(58) Field of Classification Search ........................ None
See application file for complete search history.

(56) References Cited

U.S. PATENT DOCUMENTS

| | | | | |
|---|---|---|---|---|
| 6,631,496 | B1 * | 10/2003 | Li et al. | 715/200 |
| 6,694,307 | B2 * | 2/2004 | Julien | 707/706 |
| 6,826,553 | B1 * | 11/2004 | DaCosta et al. | 1/1 |
| 7,774,301 | B2 * | 8/2010 | Johnson et al. | 707/602 |
| 7,849,049 | B2 * | 12/2010 | Langseth et al. | 707/602 |
| 2002/0032740 | A1 * | 3/2002 | Stern et al. | 709/206 |
| 2004/0153509 | A1 * | 8/2004 | Alcorn et al. | 709/205 |
| 2004/0205473 | A1 * | 10/2004 | Fisher et al. | 715/500 |
| 2005/0120009 | A1 * | 6/2005 | Aker | 707/3 |
| 2005/0165789 | A1 * | 7/2005 | Minton et al. | 707/10 |
| 2005/0198056 | A1 * | 9/2005 | Dumais et al. | 707/101 |
| 2005/0262052 | A1 * | 11/2005 | Daniels et al. | 707/3 |
| 2007/0044086 | A1 * | 2/2007 | Sampath | 717/168 |
| 2007/0061487 | A1 * | 3/2007 | Moore et al. | 709/246 |
| 2007/0083894 | A1 * | 4/2007 | Gonsalves et al. | 725/46 |
| 2007/0112714 | A1 * | 5/2007 | Fairweather | 706/46 |
| 2007/0143300 | A1 * | 6/2007 | Gulli et al. | 707/10 |
| 2007/0192676 | A1 * | 8/2007 | Bodin et al. | 715/501.1 |

OTHER PUBLICATIONS

"Conquer: A Continual Query System for Update Monitoring in the WWW," by Liu et al. (1999). Available at http://www.cc.gatech.edu/projects/disl/CQ/papers/jcs-final.pdf Last visited: May 7, 2011.*

* cited by examiner

*Primary Examiner* — Neveen Abel Jalil
*Assistant Examiner* — Daniel Kinsaul
(74) *Attorney, Agent, or Firm* — Im IP Law PLLC; C. Andrew Im

(57) ABSTRACT

A system and method for collecting and processing data over a communications network. A data mining marshaller module associates each plugin to a particular data source and manages the plugin to periodically retrieve unstructured data from the data source based on a plurality of data items to be monitored on behalf of a plurality of users. The plugins convert unstructured data received from the data sources to structured data and the data marshaller module stores the structured data in a database. This enables the system and method to aggregate and display the structured data in multiple graphical representations according to the user's preference.

28 Claims, 12 Drawing Sheets

FIG. 13

SYSTEM AND METHOD FOR COLLECTING AND PROCESSING DATA

RELATED APPLICATION

The present invention claims the benefit of U.S. Provisional Application Ser. No. 60/843,938, filed Sep. 11, 2006, which is herein incorporated by reference in its entirety.

FIELD OF THE INVENTION

The present invention is directed to a web-based application or framework for aggregating, analyzing, and displaying data. More particularly, the present invention relates to innovative techniques for providing selected subject matter data from multiple sources in one convenient location.

DESCRIPTION OF THE RELATED ART

The Internet's surge in growth since the 1990s has been dramatic. Currently, the Internet encompasses more than 350 million computers in more than 100 countries which make available volumes of information to the public. Every year, the Internet's sustained growth has rendered more and more information accessible. The resulting challenge to the public however, has been the correlative inability to efficiently process this growing large amount of information. In particular, the public has faced increased difficulty in efficiently locating, accessing, filtering, and analyzing the rising mounds of readily accessible information.

While current technology such as search engines allow users to locate pertinent information, such existent technology falls short of adequately assisting the public to process and analyze the volumes of identified information. For example, current technology generally allows a user to locate information only at discrete user-instigated intervals, forcing a user to repeatedly perform searches for information should the user require the most current data about a subject. Moreover, once a user does locate relevant information, contemporary technology fails to provide satisfactory methods for a user to efficiently aggregate, analyze, store, and process the copious amounts of available relevant information. Inevitably, this lack of technology restrains the public from being able to fully take advantage of the Internet as a source of readily available global information.

As such, a need exists for a system and method that facilitates the collection, aggregation and analysis of data in one virtual location so that the public can maximize the use of the enormous amount of available information on the Internet.

OBJECTS AND SUMMARY OF THE PRESENT INVENTION

The present invention provides an improved system and method for collecting and processing data that facilitates the collection, aggregation and analysis of data in one virtual location thereby permitting the public to maximize its use of the vast amount of global information available on the Internet.

It is an object of the present invention to provide a system and method that collects and updates specified data from multiple specified data sources in one convenient location.

It is another object of the present invention to provide a system and method that stores historic data and retrieves real-time data from multiple specified data sources regarding a specified subject so that the collected data is easily accessible by a user in one virtual location.

It is an additional object of the present invention to provide a system and method that generates and displays representational graphs regarding both historic and real-time collected data about a specified subject from multiple specified data sources all in one convenient virtual location.

It is yet another object of the present invention to provide a system and method that allows a user to select the parameters that dictate the form and style of the generated and displayed representational graphs of the collected data about a subject in one convenient virtual location.

It is a further object of the present invention to allow users to share the collected data and representational graphs about the collected data.

It is still another object of the present invention to aggregate multiple user requests or data items to the same data source, thereby providing many to one relationship. This advantageously minimizes the number of access or queries to the data source at a given time.

In an exemplary embodiment of the present invention, a system for collecting and processing data over a communications network comprises a plurality of plugins which are each configured to retrieve unstructured data from a data source over a communications network. Moreover, each plugin is configured to convert unstructured data received from a data source into structured data. The system also comprises a data mining marshaller module that associates each plugin to a data source, and associates a plurality of data items to be monitored on behalf of a plurality of users to a data source. Moreover, the data mining marshaller module manages each plugin to periodically retrieve unstructured data from the data source based on the plurality of data items to be monitored, and stores the structured data received from each plugin in a database.

In a further exemplary embodiment of the present invention, the data mining marshaller module is operable to associate each plugin with one of a plurality of data sources that are defined by the users. In another exemplary embodiment of the present invention, each data source is accessed by a plugin associated with each data source. In an exemplary embodiment of the present invention, the data mining marshaller module is operable to determine if the data item needs to be updated and is operable to manage a plugin associated with the data item to update the data item. In yet another exemplary embodiment of the present invention, the data mining marshaller module is operable to load and launch a plugin associated with a specific data item to retrieve the unstructured data in response to the data item to be monitored.

In an exemplary embodiment of the present invention each plugin further comprises a filter module for filtering unstructured data in response to a plurality of data item parameters. In yet a further exemplary embodiment of the present invention, the filter module is operable to filter unstructured data in response to one or more data item parameters received from the plurality of users. In yet another embodiment of the present invention, the data mining marshaller module further comprises a filter module for filtering structured data in response to a plurality of data item parameters.

In another exemplary embodiment of the present invention, the system further comprises a display navigation module for displaying the stored structured data received in response to the data item associated with a user. In another exemplary embodiment of the present invention, the display navigation module is operable to display the stored structured data in a plurality of graphical representations selectable by the user. In further exemplary embodiments of the present invention, the display navigation module is operable to display structured data in one or more following graphical representations:

displaying the structured data related to one data item associated with the user, displaying structured data related to two or more data items associated with the user; displaying structured data associated with the user from a single data source; displaying structured data associated the user from multiple data sources.

In yet another exemplary embodiment of the present invention, the system further comprises an activation module for generating a watch group by a user, where the watch group comprises a data item; associated data sources; and graphical representations of the structured data. In another exemplary embodiment of the present invention, the activation module is operable to enable the user to share the watch group with another user.

In a further exemplary embodiment of the present invention, the system further comprises a user device for accessing the data mining marshaller module, wherein the display navigation module is operable to display structured data on the user device.

These and other features of the present invention will become better understood with reference to the following description and appended claims.

DESCRIPTION OF THE DRAWINGS

Embodiments of the present invention will be described with reference to the attached drawings in which like components or features in the various Figures are represented by like reference numbers.

FIG. 13 is an exemplary screenshot of the Watch Group Report Page displaying Watch Group data per Data Source Group in graphical form.

DESCRIPTION

Figure 1:
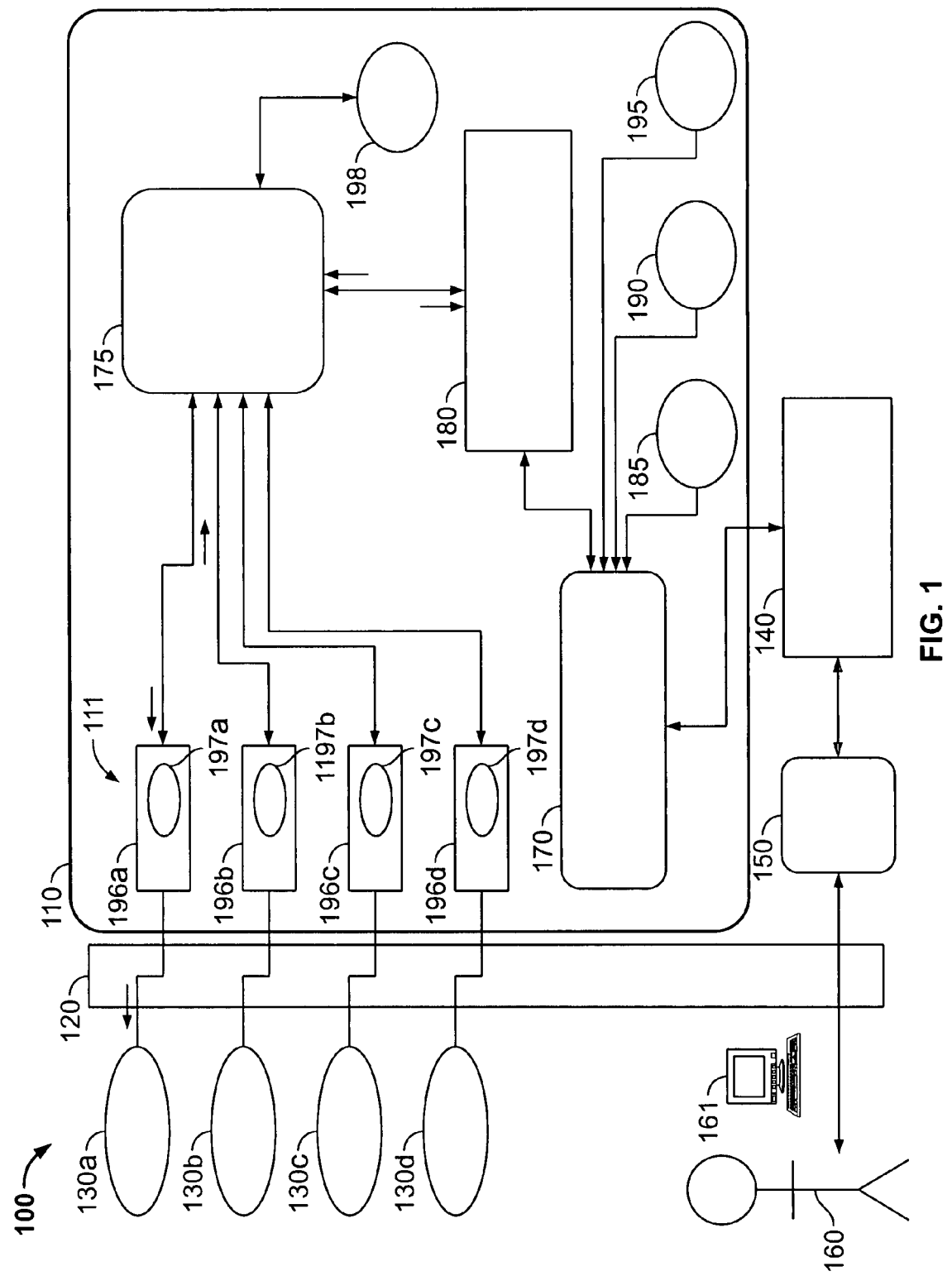
FIG. 1 is a network incorporating the system of the present invention and a block-diagram of the major modules of the present invention.

The present invention is directed to a real-time information retrieval and processing system that is capable of aggregating relevant data and creating analytical views of multiple streams of the data in one convenient place. Such a system may be particularly beneficial to media, entertainment, business, and marketing research enterprises that require access to real-time data (in addition to historical data) in order to fully and efficiently analyze the copious amounts of data often critical to their business endeavors.

Specifically, the inventive system and method offers a web-based application or framework that is capable of locating relevant data, storing historical data, updating the stored data, and creating analytical graphic snap shots of that data. These graphical snap shots can present data from sources including but not limited to social networks, social media sources, search results, major web portal charts, video assets, sales data, blog buzzes, social bookmarking and adoption metrics, file trading, and the like. The inventive system and method can create several tiers of comprehensive graphical representations of collected data, including but not limited to high-level executive summaries and in-depth drill-downs to the data sources themselves. Moreover, the graphical representations can be generated on many levels of abstraction including but not limited to: executive one-line summaries of selected data; graphs displaying trending over time; drill-downs on any data summaries to the data sources themselves; graphing to the source of the data to show the context in which trends are built; tabular data displays to show the exact numbers used in determining analytical figures; and virtually all other possible analytical graphic representations of data. The inventive system and method further allows users to overlay multiple data sources in a single graph, as well as significant project events (project launches, advertising campaigns, TV and radio appearances, concerts, et cetera) to draw clear cause-and-effect relationships between events, and to delineate or affect the impact of those events across several marketing channels. The inventive system and method also incorporates a business's proprietary client data or even outside vendors or internal sales and marketing data into its collection, processing, and analysis of a user's selected subject matter. As such the inventive system and method acts as an intelligence platform that greatly assists users in tracking and analyzing data regarding selected subject matter.

These capabilities allow for detailed research that facilitates a user's analysis of relevant data. Such detailed research facilitated by the present invention includes but is not limited to the measurement of marketing and advertising returns on investment, the tracking of copyrights, viral assets, media, competition, and the like. The inventive system and method offers a one-stop digital overview that features comprehensive array research results for selected data that represent the vital signs of a user's projects. As such the present inventive system and method, acts as an intelligence platform that can significantly aid any business enterprise to fully and completely use the enormous amount of information on the Internet by facilitating the constant collection and analysis of the selected subject matter data presented in a user-friendly form all in one location. For example, the present inventive system and method can help television networks, film studios, recording artists, record companies and independent producers measure marketplace trends and the impact of their products on the important and growing peer-to-peer distribution system. The inventive system essentially turns the collected information into intelligence by providing up-to-the-minute, actionable facts that can make an immediate impact on decision-making.

Generally, the inventive system is provided as a web-based application or framework such as a website which a user can access through the Internet by having an account with the website. Once an account is opened, the website allows the user to create a Watch Group where the user specifies the subject matter he wishes to monitor; the data sources he wishes to monitor for the specified subject matter; and any filters the user wishes to apply to the data actually retrieved by the inventive system about the selected subject matter from the specified data sources. Once the user has created the Watch Group, the inventive system modules begin monitoring the selected data sources for the subject matter selected by the user and stores any data retrieved from the data sources regarding the Watch Group subject matter. The system modules store any first retrieved data and can store all updated data retrieved at periodic intervals. As such, the inventive system is capable of storing, presenting, and analyzing historical data as well as real-time data about the selected subject matter.

Once information has been retrieved, the system allows the user both to view the actual collected information and to view the collected information in graphically presented forms all at one location—the website or even on one web page. For example, the system can present graphs where the x-axis represents time and the y-axis (or axes) represent the Data Sources. The inventive system can also change the display parameters according to the preferences of the user. For example, the system can: drill-down to data sources from the actual data points on the graph; overlay data from different data sources for the same Watch Group all on one graph or on side-by-side graphs; overlay data from different graphs for different Watch Groups all on one graph or on side-by-side graphs; allow the user to change the actual graph layout or style; and create any other type of digital representation of the collected data.

A brief example of an embodiment of the present invention is now described. A musician, "Jane Smith," who would like to monitor the success of her latest album, "AlbumEx1," opens an account in the "WebsiteEx1.com," which comprises the inventive processes described herein. She enters her account on WebsiteEx1.com and is given the option to create a Watch Group for any subject matter she desires to monitor. In this example, WebsiteEx1.com receives Jane Smith's inputted Watch Group: "AlbumEx1." The inventive processes of WebsiteEx1.com display default options for data sources Jane Smith may want to monitor for AlbumEx1. The inventive processes also display text fields where Jane Smith may specify a data source of her own choice to monitor for AlbumEx1. WebsiteEx1.com receives Jane Smith's elected data sources: JaneSmithblog.com, albumsales.com, and musicsales.com. The inventive processes of WesbiteEx1.com then allow Jane Smith to specify any "filters" she may want to apply to the information retrieved from the specified data sources regarding AlbumEx1. For example, one can filter data based on language preference. In this exemplary case, WebsiteEx1.com receives Jane Smith's election only to retrieve information from JaneSmithblog.com that is in the English language. Once the Watch Group is complete, the inventive processes of WebsiteEx1.com begin retrieving data regarding AlbumEx1 from the specified data sources: JaneDoeblog.com, albumsales.com, and musicsales.com. The inventive processes of WebsiteEx1.com retrieve and store data regarding AlbumEx1 according to default update intervals, such as every three hours. Alternatively, the inventive processes of WebsiteEx1.com can update the data based on an update interval specified by Jane Smith.

The inventive processes of WebsiteEx1.com then display various options to Jane Smith for viewing the collected information. For example, the inventive processes of WebsiteEx1.com can display an Executive summary of the collected AlbumEx1 data from all three data sources—JaneSmithblog.com, albumsales.com and musicsales.com. This aggregate graph quickly and easily shows any correlation between blog comments and actual sales of the album. The inventive processes of WebsiteEx1.com can also drill-down to the data sources themselves when the user clicks on the actual data points on the graph. The inventive processes of WebsiteEx1.com also can overlay the AlbumEx1 data from all three data sources—JaneSmithblog.com, albumsales.com, and musicsales.com—for the same Watch Group all in one graph or on side-by-side graphs. As will be discussed in greater detail below, the inventive processes of exemplary WebsiteEx1.com can produce any graphic representation of the collected data as would be understood by those of skill in the art. As such, the inventive processes of exemplary WebsiteEx1.com can greatly assist musician, Jane Smith, in collecting, tracking, storing, and analyzing Internet data regarding her new AlbumEx1 which, in turn, assists Jane Smith in promoting her sales and making other critical business decisions.

With reference to the Figures, further exemplary embodiments of the present invention are now described in greater detail. Although the description includes exemplary embodiments, it can be easily seen that other embodiments are possible, and changes can be made to the embodiments described without departing from the spirit of the disclosed system and method.

The presently disclosed system and method can be implemented using hardware, software or a combination of hardware and software. Particularly, the disclosed system and method can be implemented using a computer system with a single personal computer or a network of multiple computers in local area networks, wide area networks, intranets or the Internet. The disclosed system and method can be implemented using either object-oriented programming languages, like the JAVA™ and C++ programming languages, or procedural programming languages such as the C programming language. JAVA is a registered trademark of Sun Microsystems, Inc. Preferably, the disclosed system and method are implemented as a JAVA-based application accessible by multiple end user computers on a website available over the Internet.

Referring now to FIG. 1, there is shown a typical network configuration 100 in which the invention may operate and a block diagram showing the major modules of the invention. In alternate embodiments, however, various other types of electronic devices communicating in a network may also be used and various other modules may be included as would be well understood by those of skill in the art. A User 160 communicates with a computing environment, which may include a Web Server 150 or multiple server computers in a client/server relationship on a network communication medium such as the Internet 120. In a typical client/server environment, Web Server 150 includes a Web Application 170 that communicates with a User Device 161, which may be a personal computer (PC), a hand-held electronic device (such as a PDA), a mobile or cellular wireless phone, a TV set, or any other web-enabled electronic device as would be understood by those of skill in the art.

The Server 150 and the User Device 161 may each have any conventional general purpose single- or multi-chip microprocessor. In addition, the microprocessor may be any conventional special purpose microprocessor such as a digital signal processor or a graphics processor. Additionally, the Server 150 and the User Device 161 may be a desktop, server, portable, hand-held, set-top, or other type of computing devices. Furthermore, the Server 150, and the User Device 161 each may be implemented in connection with any operating system.

The Server 150 and the User Device 161 may each include a network terminal equipped with a display, keyboard and pointing device. In an exemplary embodiment of the Network 100, the User Device 161 includes a web browser used to access the Server 150. The User 160 through the User Device 161 may utilize the browser to remotely access a website hosted by Server 150 using a keyboard and/or pointing device and a display, such as a monitor. Although FIG. 1, shows only one User Device 161, the Network 100 may include any number of User Devices.

The Network 100 may be any type of electronic transmission medium, for example, including but not limited to the following networks: a virtual private network, a public internet, a private internet, a secure internet, a private network, a public network, a value-added network, an intranet, or a wireless gateway. The term "virtual private network" refers to a secure and encrypted communications link between nodes on the Internet 100, a Wide Area Network (WAN), Intranet, the Internet 120 or any other network transmission means. In addition, the connectivity to the Network 100 may be via, for example, Ethernet, Token Ring, Fiber Distributed Datalink Interface, Asynchronous Transfer Mode, Wireless Application Protocol, or any other form of network connectivity. The User Device 161 may connect to the Network 100 by use of a modem or by use of a network interface card that resides in the User Device 161.

FIG. 1 also includes an Application Facility 110, which includes various software modules for retrieving, updating and displaying data requested by User 160 as contemplated by the present invention. Although the term facility is used, components do not necessarily need to be at a common location. Application Facility 110 also comprises Database 180 which stores all necessary information for properly executing the processes of the present invention. FIG. 1 also includes Data Sources 130a-d which are generally any sources located on the Network 100 from which data originates and from which modules in Application Facility 111 are able to retrieve data. Data Sources 130a-d are not necessarily the original sources of the data, but are the sources from which the modules of Application Facility 111 may obtain data. For example, a Data Source includes but is not limited to a website which aggregates blog posts, websites generally, XML feeds, RSS feeds, and data specific API's/protocols.

As would be well known to those of skill in the art, devices other than the hardware configurations described above may be used to communicate with Server 150.

As explained above, Application Facility 111 includes various software modules for retrieving, updating and displaying data requested by User 160. In one exemplary embodiment of the present invention, Application Facility 111 comprises: Plugins 196a-d; a Data Mining Marshaller Module 175 (DMM Module); a Log-In Module 185; a Creation/Activation Module 190; a Display/Navigation Module 195; and a Verification Filter Module 197. Each module will be described and then referred to in the operation of an embodiment of the present invention.

In one exemplary embodiment of the present invention, Plugins 196a-d are the main software modules which are responsible for all communication with Data Sources 130a-d. Plugins 196a-d comprise at least a Java™ class and a set of metadata which are stored in Database 180. The Java™ class implements an abstract method inherited from the Java™ class "Plugin," well known to those of skill in the art. Essentially, Plugins 196a-d retrieve unstructured data from Data Sources 130a-d and parse the data into highly structured forms that can be used by the other modules of the present invention.

Each Plugin implementation can be different, depending on the particular information available from the Data Source. For example, in a preferred embodiment, each Plugin will have a Filter (197a-d) to "filter" certain types of irrelevant information from the relevant information. Filters can be pieces of code which process the structured data generated by the Plugins 196a-d by "filtering" out certain data based on a pre-determined rule or condition. For example, a language filter can be added to a Plugin that retrieves information from a blog posting to filter any data that is not in English. The Filter 197a can take structured blog post data generated from Plugin 196a and determine whether the blog posting is in English. Filter 197a can then only allow blog post data in English to pass to the other modules and discards blog post data in other languages. Each Plugin 196a-d can have any number of associated Filters.

Generally, Plugins 196a-d can be as small as a few lines of code or as large as a complete system—depending on the needs of the particular data retrieval and filtering implementation. Moreover, in accordance with an exemplary preferred embodiment, each Plugin 196a-d has a one-to-one relationship with a particular Data Source 130a-d in order to minimize processing overhead and to prevent a particular Data Source website from being overwhelmed with "hits." The Plugins 196a-d have access to a file system, as well as the ability to connect to foreign hosts. Otherwise, the Plugins 196a-d are completely independent of the rest of the system, i.e., they have no access to Database 180, and each Plugin has no knowledge of any other Plugins. By keeping the Plugins 196a-d independent, the system and method of the present invention can keep complex interdependencies to a minimum, thereby simplifying any necessary maintenance tasks. For example, if any individual Plugin malfunctions, the errant Plugin has no effect on the operation of any other Plugin in the system. This independence additionally makes the system of the present invention extremely fault tolerant, which advantageously aids in the scalability of the system.

The Plugin metadata comprises the operational details of Plugins 196a-d. In an exemplary embodiment of the present invention, for each Plugin 196a-196d, the metadata stored in Database 180 comprises at least six (6) variables which will be described herein. By way of example, Plugin 196a and associated Data Source 130a will be used in the description of each data value.

Full Class Name: The full JAVA class name of Plugin 196a, including package names, e.g., net.invention.examples.Exampleplugina.

Data Source Update Frequency: This value indicates how frequently the data retrieved from the associated Data Source 130a is updated. In an exemplary embodiment, the update intervals can be programmed to correspond to the data update frequency of the Data Source itself. For example, if Data Source 196a is an Rich Site Summary or RDF Site Summary (RSS) feed which is only updated once every twenty-four (24) hours (as is usually the case for RSS feeds), the corresponding Plugin 130a for Data Source 196a can be set to update every twenty-four (24) hours as well. This prevents useless system overhead by not attempting to update data residing on Database 180 that has not yet been updated on the Data Source itself.

Plugin Name and Description: This value is a name and brief description of the Plugin 130a and Data Source 196a for use either by programmers or by the other modules of the present invention. For example, a module can use the Plugin Name and Description value to display the name of the Plugin and Data Source to the User 160.

Input Data Type: This value indicates data input type that the Plugin 130a expects to obtain from the Data Source 196a. Current data types include but are not limited to: Uniform Resource Locator (URL), Amazon™ Standard Identification Number (ASIN), and query. Amazon.com is a trademark of Amazon.com, Inc. Any and all data types are contemplated by the present invention as understood by those of ordinary skill in the art.

Plugin API Keys: This value retains the necessary keys required for a Plugin to enter a Data Source that requires such a key, such as many Data Sources that require secure connections.

Return Data Type: This value of the Plugin Application Program Interface (API) Key identifies the data type that the Plugin must return upon processing the unstructured data into the highly structured data. Essentially the Plugin will return the data in a particular Return Data Type that can be used by the other modules of the present invention. For example, blog postings are returned from Plugin 196a in a "Post" Return Data Type, which can include specific fields such as the Title, Description, Author, Publish Date, etc. Current Return Data Types can include but are not limited to: events, peer-to-peer (P2P) data, blog items, product reviews, images, movies, audio, bookmarks, statistics, and the like.

In addition to storing the Plugins and the Metadata, in an exemplary embodiment of the present invention, Database 180 also stores values for Data Source Inputs which can be provided by a module of the present invention as discussed herein. The Data Source Input is the general term for the input selected by User 160 and provided to the Plugin 196a. The Data Source Input provides information as to the types of data that the Plugin 196a should request from the particular Data Source 130a. For example, if Plugin 196a collected stock prices, a specific Data Source Input item would be a specific stock ticker symbol: Data Source Input items can include but are not limited to: URLs, queries—as would define a string of human readable words or a specific name or title, such as but not limited to a musician's name or an album title/company name; stock ticker symbols; data specific identifiers including but not limited to codes, such as bar code ids, ASIN identifiers, etc. and the like; and any other Data Source Input items as would be understood by those of ordinary skill in the art. In addition, the Database 180 stores the last time that the particular Data Source Input item was updated and stores a pointer to the appropriate Plugins associated with the Data Source Input item.

In accordance with an exemplary embodiment of the present invention, the Data Mining Marshaller Module 175 (the DMM Module) generally controls the loading and calling of all Plugins and is responsible for: requesting data from the Plugins 196a-d; receiving structured data from the Plugins 196a-d; transmitting the received Plugin data to Database 180 for storage; and updating the data in the Database 180. The DMM Module 175 is also responsible for determining which Data Source Input items need to be updated based on the Data Source Update Frequency associated with each Data Source and the last time the particular Data Source Input item was updated. Moreover, in an exemplary embodiment of the present invention, the DMM Module 175 uses JAVA Reflection so that it can load various Plugins when a particular Plugin is actually needed, thereby enabling the present invention to add new Plugins to the system without needing to restart the whole system. In accordance with an exemplary embodiment of the present invention, the DMM Module 175 can be run continuously (stopping only for routine maintenance or emergencies).

In an exemplary embodiment of the present invention, Log-In Module 185 controls the logging in process of the User 160 through the website to the User's account.

In an exemplary embodiment of the present invention, Creation/Activation Module 190 provides the necessary processing for a User 160 to identify the subject matter the User 160 wishes to monitor and to then create, activate, and modify "Watch Groups" for that subject matter. Watch Groups are essentially Data Source Input items or collections of the subject matter that the User 160 wishes to monitor. Creation/Activation Module 190 also provides the necessary processing for creating, activating and modifying "Watch Folder" which are essentially collections of Watch Groups that are grouped together in one virtual folder.

In an exemplary embodiment of the present invention, the Display/Navigation Module 195 allows User 160 to manipulate and share the collected data in the Watch Groups. The Display/Navigation Module 195 further allows the User 160 to manipulate the Watch Group data according to the User's 160 viewing preference. For example, Display/Navigation Module 195 is capable of presenting information on many levels of abstraction from high-level executive summary views to the most granular level, including but not limited to: executive one line project summaries; graphs showing trends over time drill-downs on those summaries; tabular data displays to show the exact numbers in determining analytical figures etc. Moreover, the Display/Navigation Module 195 can overlay multiple Watch Group Data Sources in a single graph, including significant project events to draw clear 'cause-and-effect' relationship between events and the impact of those events across several marketing channels.

In a further exemplary embodiment of the present invention, Display/Navigation Module 195 is also able to analyze the data retrieved from the Data Sources 130a-d and present results of the analysis in various forms including but not limited to graphs, charts, lists, etc. Such analyses include but are not limited to: the "Top 3" upwardly trending movers by both project and Data Source; the "Top 3" down-trending movers by both project and Data Source; the combined direction of all projects being tracked by a User's account; the current direction each of user's key projects; the sales and marketing efforts are having the most impact; the influence of recent events on radio, TV and/or Web; real-time sales rankings from selected sources (physical and digital); comparative sales analysis; the measure of threats from competitive and import activity; key words used to describe products and experiences with products; which User assets are currently on-line; where to focus to have an immediate impact for publicity purposes; which images are being positioned by fans; potential piracy indicators; the categorization of sentiments stated in reviews regarding a User's products, goods, or activities; identifying a User's assets on-line, specified by a certain pre-determined conditions including but not limited to popularity of an asset or economic growth of an asset; the pace of song file trading among users of P2P networks; early warnings on 'leaked' tracks; trading activity on 'unofficial' versions of songs; the number of incoming links to the sites that the User has chosen to track; how those sites rank against broader web traffic; a measure of the audience per site; a full compliment of all graphs for the data for a specific project; drill-downs from each graph to detailed source data; the ability to create graph overlays from any graph and any other type of analytical tool or medium regarding collected data as would be understood by those of ordinary skill in the art.

In yet a another exemplary embodiment of the present invention, Display/Navigation Module 195 can provide additional resources and actions regarding selected information that may be of assistance or interest to User 160 including but not limited to: one-click access to product reviews written by fans and consumers; ratings and reactions from consumers who have purchased products; the activity and sentiment of "the congregation vs. the choir" relating to a User's subject; real-time posting data to benchmark the tipping point on sales; insight of music fans in their discovery phase of the buying cycle; easy access to comprehensive entries from Data Sources; the context in which potential consumers are framing User releases; the alignment of radio, TV, press, and appearances; an option to manually enter key last minute or internal events; an option to manually enter key campaign information; an option to view and/or edit press before it goes into print; what's happening now, because "press goes away after today"; and any other type of resources or actions regarding selected information that may be of assistance or interest to a User as would be understood by those of ordinary skill in the art.

In an embodiment of the present invention, the Display/Navigation Module 190 displays at least twelve User interface pages on the website where the above iterated analytical tools, resources, and assistive actions are provided to the User 160. For example, in one exemplary embodiment of the present invention, the Display/Navigation Module 190 displays: a Home Page, an Account Summary Page, a Sales Page, a Product Review Page, a Media Page, a Blog Buzz Page, a Find Fan Page; a Press Page; an Events Page, a P2P Page, a Webstat Page, a Graphs Page.

The Home Page shows: the "Top 3" upwardly trending movers by both project and Data Source; the "Top 3" down-trending movers by both project and Data Source; and the combined direction of all projects being tracked by a user's account. Display/Navigation Module 195 automatically presents this page upon User log in provided that the User 160 has already set up at least one watch Group. The Account Summary Page shows: a current direction of each of User 160's key projects; which sales and marketing efforts are having the most impact; and the influence of recent events on radio, TV and/or Web. Display/Navigation Module 195 presents this page when the User selects the Account Summary Page from the Home Page. The Sales Page shows: real-time sales rankings from selected Data Sources (physical and digital); comparative sales analysis; the measure of threats from competitive and import activity; and one-click access to product reviews written by fans and consumers. Display/Navigation Module 195 presents this page when the User selects the Account Summary Page from the Home Page.

The Product Review Page shows: ratings and reactions from consumers who have purchased products; key words used to describe products and experiences with products; and options for the inventive system users to categorize the sentiment stated in each review. The Media Page shows: which of the User assets are currently on-line; which images are being positioned by fans; and potential piracy indicators. The Blog Buzz Page Shows: the activity and sentiment of "the congregation vs. the choir"; identifying a User's assets on-line, specified by a certain pre-determined conditions including but not limited to popularity of an asset or economic growth of an asset; and real-time posting data to benchmark the tipping point on sales. The Find Fan Page shows: insight of music fans in their discovery phase of the buying cycle; easy access to comprehensive entries from various Data Sources; and the context in which potential consumers are framing your releases.

The Events Page shows: the alignment of radio, TV, press, and appearances; an option to manually enter key last minute or internal events; and an option to manually enter key campaign information. The Press Page shows: press before it goes into print; what's happening now, because "press goes away after today"; and publicity where to focus to have an immediate impact. The P2P Page shows: the pace of song file trading among users of P2P networks; early warnings on 'leaked' tracks; and trading activity on 'unofficial' versions of songs. The Webstats Page shows: the number of incoming links to the sites that the user has chosen to track; how those sites rank against broader web traffic; and a measure of the audience per site. The Graphs Page shows: a full compliment of all graphs for the data for a specific project; Drill-downs from each graph to detailed source data; and the ability to create graph overlays from any graph.

It will be understood by one of ordinary skill in the art that in alternate embodiments more or less web pages could be available to the User providing more or less services related to the gathered information without departing from the spirit and scope of the present invention.

In an exemplary embodiment of the present invention, Verification Filter Module 198, is responsible for ensuring that the Plugin is returning appropriate data. For example, the Verification Filter Module 197 filters out NULL values, verifies that the updated time stamp is correct, and verifies that the structured data received from the Plugin is in the correct Data Return Type.

The following description presents method steps that may be implemented using processor-executable instructions, for directing operation of a device or devices under processor control. The processor-executable instructions may be stored on a computer-readable medium, such as a CD, DVD, flash memory, or the like. The processor-executable instructions may also be stored as a set of downloadable processor-executable instructions, for example, or downloading and installation from an Internet location (e.g., Web server).

Exemplary embodiments of the inventive processes of the present invention will be described in two sections: 1) the data retrieval and update processes performed by the Plugins 196a-196d and the DMM Module 175; and 2) the User Interaction processes performed primarily by the Log-in Module 185, the Creation/Activation Module 190, the Display/Navigation Module 195, and the Filter Module 197 regarding User's 160 interaction with the retrieved information.

The Data Retrieval and Update Operations of the present invention will now be discussed with reference to FIG. 1. The DMM Module 175 queries the Database 180 for a predetermined number of Data Source Input items (DSIIs) to analyze. For example, DMM Module 175 requests 1000 DSIIs from Database 180. In one exemplary embodiment, DMM Module 175 can process a set number of DSII's at one interval. In an alternate embodiment, a variable number of DSII's can be processed by the DMM Module 175. As explained above, the DSIIs are identified by the User 160 and are essentially the subjects for which the User 160 is requesting information.

In an exemplary embodiment, the DMM Module 175 receives the DSIIs from the Database 180 in the order that the DSIIs initially were entered into the Database 180. For example, DMM Module 175 first gathers DSII0-DSII1000, processes these specific DSIIs, and subsequently DMM Module 175 gathers the next set of DSIIs, DSII1001-DSII2000. This assures that each DSII block is processed in a timely manner.

The DMM Module 175 examines each individual DSII to determine whether that particular DSII needs updating. In an exemplary embodiment, the DMM Module 175 adds the value of the Data Source Update Frequency associated with such DSII to the last updated time for such DSII and then compares that sum value against the current time. If the computed updated time is less than the current time, the DMM Module 175 identifies the particular DSII to update because the update time has passed. Any and all methods for updating either known or new DSIIs is contemplated by the present invention as would be understood by one of ordinary skill in the art. In updating the DSII, the DMM Module 175 can save every update separately in the Database 180, so as to preserve the historical DSII data or in an alternate embodiment it can overwrite the existing DSII data in order to maximize storage space, or alternatively it can store some and overwrite others based on predetermined parameters.

Once the DMM Module 175 identifies which of the DSIIs need to be updated from the selected DSII set initially received from Database 180, the DMM Module 175 sorts the DSIIs requiring updates into groups based on the specific Plugin associated with the DSII. For example, if Plugin 196a collects information about stocks from the XYZ Investing House website, all DSIIs having a particular stock ticker symbol from the set of DSIIs needing updating is grouped and associated with Plugin 196a. The DMM Module 175 then dynamically loads only the Plugins which are necessary to process the current block of DSIIs. This dynamic loading of Plugins and the many-to-one association of DSIIs to Plugins enables the present invention to avoid additional and unnecessary overhead. Specifically, because the Plugins are loaded during the operation of the DMM Module 175 (which typically operates 24 hours a day seven days a week absent emergencies or required maintenance), any Plugin bugs can be fixed, replaced and loaded into the system without the need to restart the whole system. Essentially, any Plugin bug can be fixed by simply replacing the old corrupted class file with the updated remedied one.

The DMM Module 175 separates Plugin threads with the first DSII in the particular Plugin group. In an exemplary embodiment of the present invention, each loaded Plugin 196a-196d is given its own thread of operation. As such, the present invention allows for multiple streams of execution per Plugin to take place concurrently. Each called Plugin, then accesses its associated Data Source 130 or each DSIIs queued in its group. For example, if Plugin 196a were loaded, Plugin 196a would access Data Source 130a for each DSII in its group. For each DSII, the Plugin accesses the associated Data Source 130 to retrieve any information associated with the DSII. In an exemplary embodiment of the present invention, there is a one-to-one relationship between the Plugin 196 and the Data Source 130, but the relationship can be many-to-one or one-to-many. For example, the Plugin 196a accesses associated Data Source 130a and queries for the specific DSII information. The Plugin 196a then obtains the information from the Data Source 130a in an unstructured form. The Plugin 196a then parses the unstructured data into the highly structured Return Data Type expected by the DMM Module 175. Once the Plugin 196a finishes processing an individual DSII, the Plugin 196a returns the structured data to DMM Module 175. The DMM Module 175 then proceeds with the next DSII waiting in the specific Plugin queue.

In an exemplary embodiment of the present invention, the DMM Module 175 also performs additional processing which can be concurrent with the running of the Plugin threads, such as calling the Filter Module 197 to process each piece of structured data received from the Plugins. Specifically, the DMM Module 175 calls the Filter Module 197 to filter the structured data associated with each DSII received from the Plugin in order to ensure that the Plugin is returning appropriate, readable data. For example, in an exemplary embodiment of the present invention, the Filter Module 197 filters out NULL values, verifies that the updated time is correct and that the structured data is in the correct format. Once the structured data is verified, the DMM Module 175 stores the updated DSII data in the Database 180 and updates the last updated time in the specific DSII Database entry. Once the updated data is stored and filtered in the Database 180, the User 160 can send a data request to the Database 180 via the Web Server 150 using the Display/Navigation Module 195.

Figure 2:
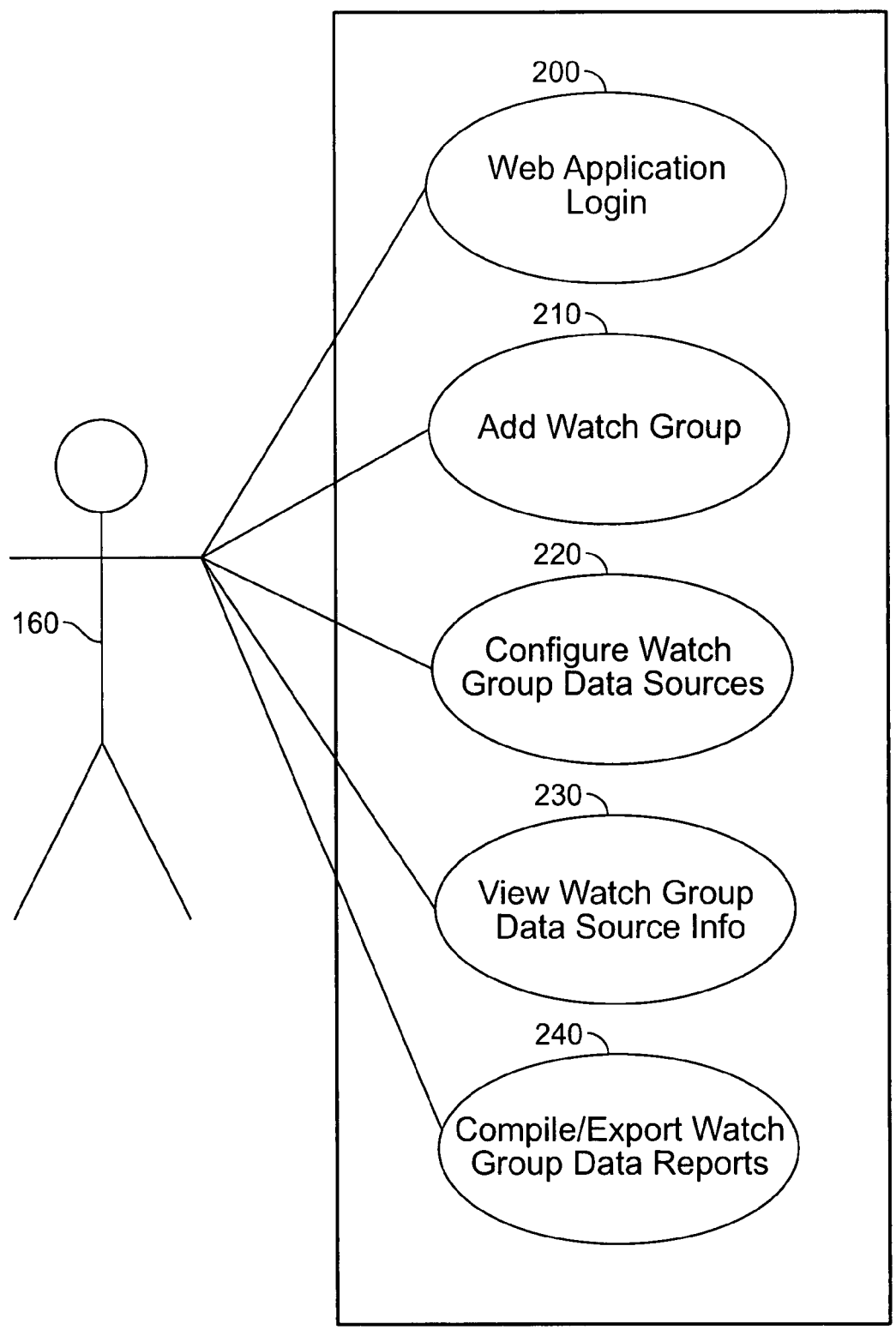
FIG. 2 is a flow chart illustrating steps that can be taken by a user in accordance with the inventive processes of the present invention.

An overview of embodiments of the inventive process available to the User 160 will now be discussed with reference to FIG. 2, followed by a more detailed description of exemplary embodiments of the steps with reference to FIGS. 9-13. In accordance with an exemplary embodiment of the present invention, the system provides a website portal accessible through the Internet by the User 160. The User 160 logs into the web application 170 at step 200 in order to access the User account. The User 160 can add a Watch Group at step 210. In setting up the Watch Group, the User 160 specifies the DSIIs she wishes to monitor. Once a Watch Group is set up, the User 160 selects the Data Sources associated with the Watch Group at step 220. At step 230, the User 160 may view the retrieved Watch Group information. At step 240, the User 160 can compile, export and otherwise manipulate the Watch Group or Watch Groups.

Figure 3:
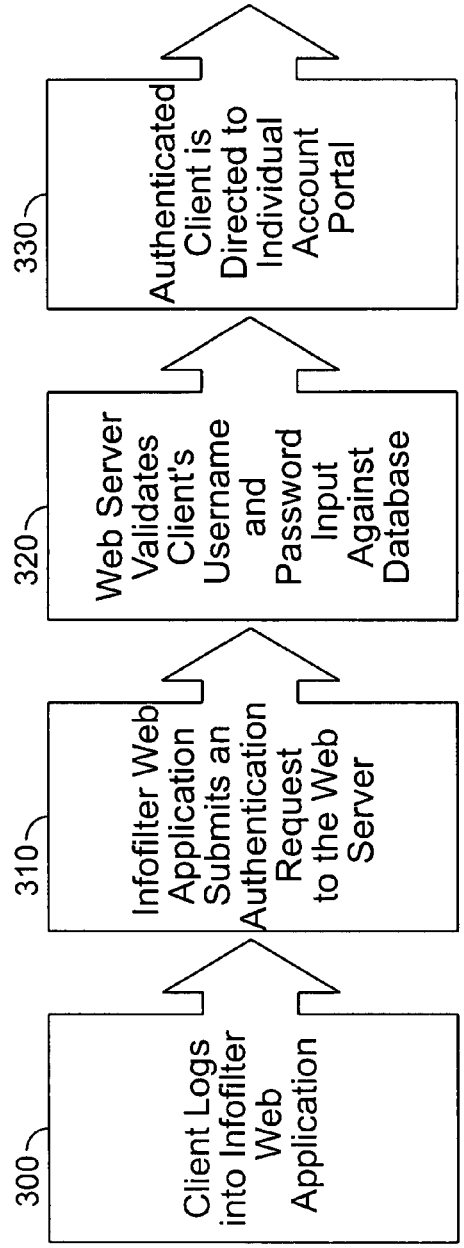
FIG. 3 is a flow chart illustrating an exemplary log-in process in accordance with an embodiment of the present invention.

Turning now to FIG. 3, a flow chart detailing the process of logging into the inventive system in accordance with an exemplary embodiment of the present invention is described. At step 300, the Log-in Module 185 receives a username and password provided by the User 160. Any and all login methods are contemplated by the present invention including but not limited to biometrics, magnetic stripe recognition, username/password, and the like, as would be understood by one of ordinary skill in the art. At step 310, the Log In Module 185 submits an authentication request to the Web Server 150. At step 320, the Web Server 150 validates the User 160 username and password input against a username and password stored in the Database 180. If the username and password matches an account, then the Log In Module 185 directs the authenticated User 160 to an individual account portal.

Figure 4:
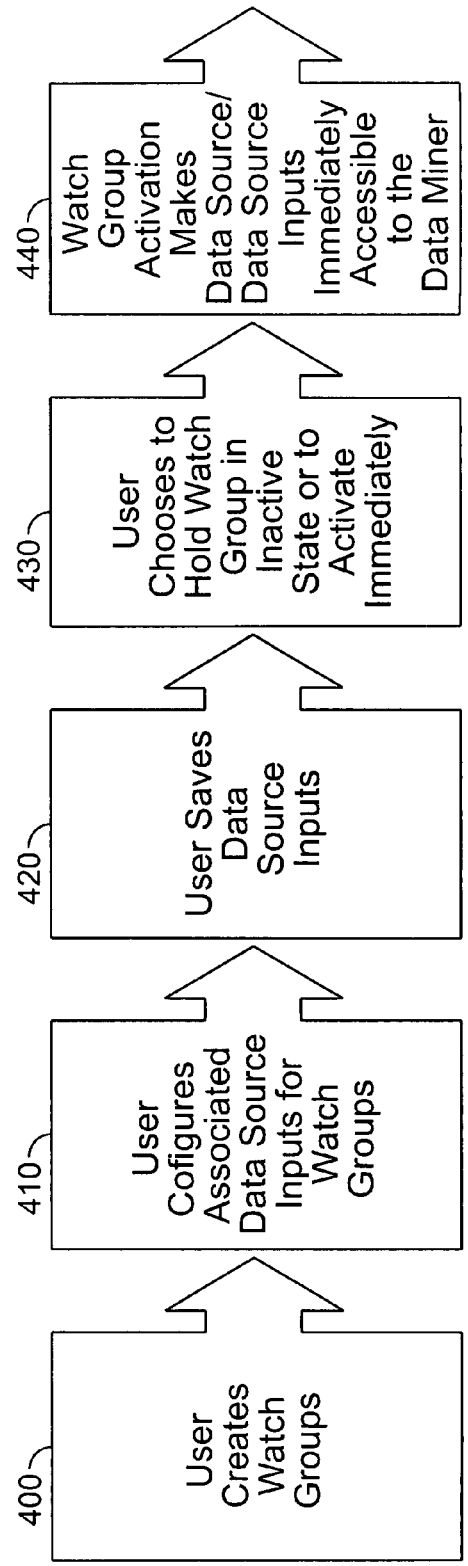
FIG. 4 is a flow chart illustrating an exemplary process for creating a Watch Group in accordance with an embodiment of the present invention.
Figure 10:
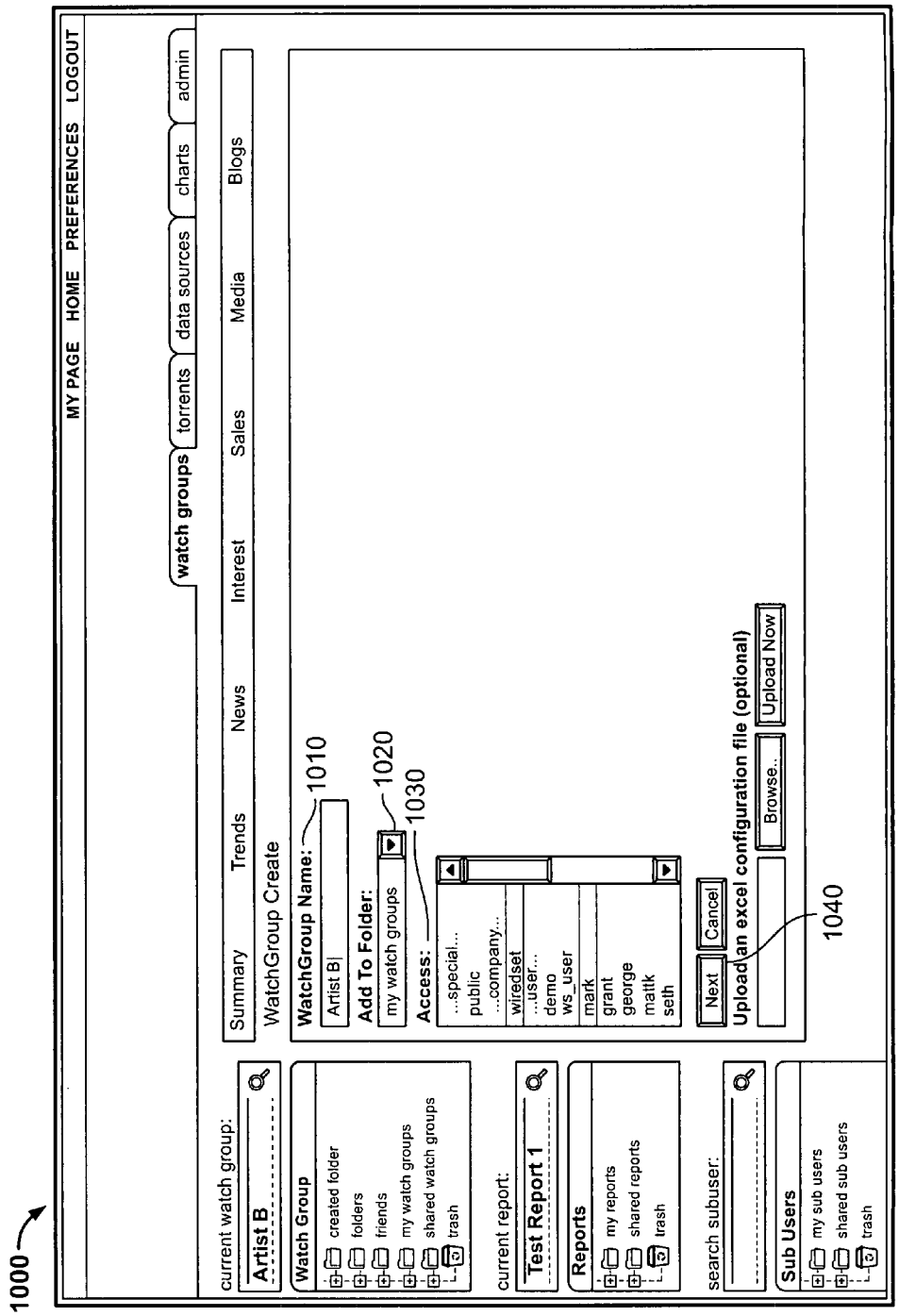
FIG. 10 is an exemplary screenshot of the Watch Group creation webpage displayed by Display/Navigation Module 195.
Figure 11:
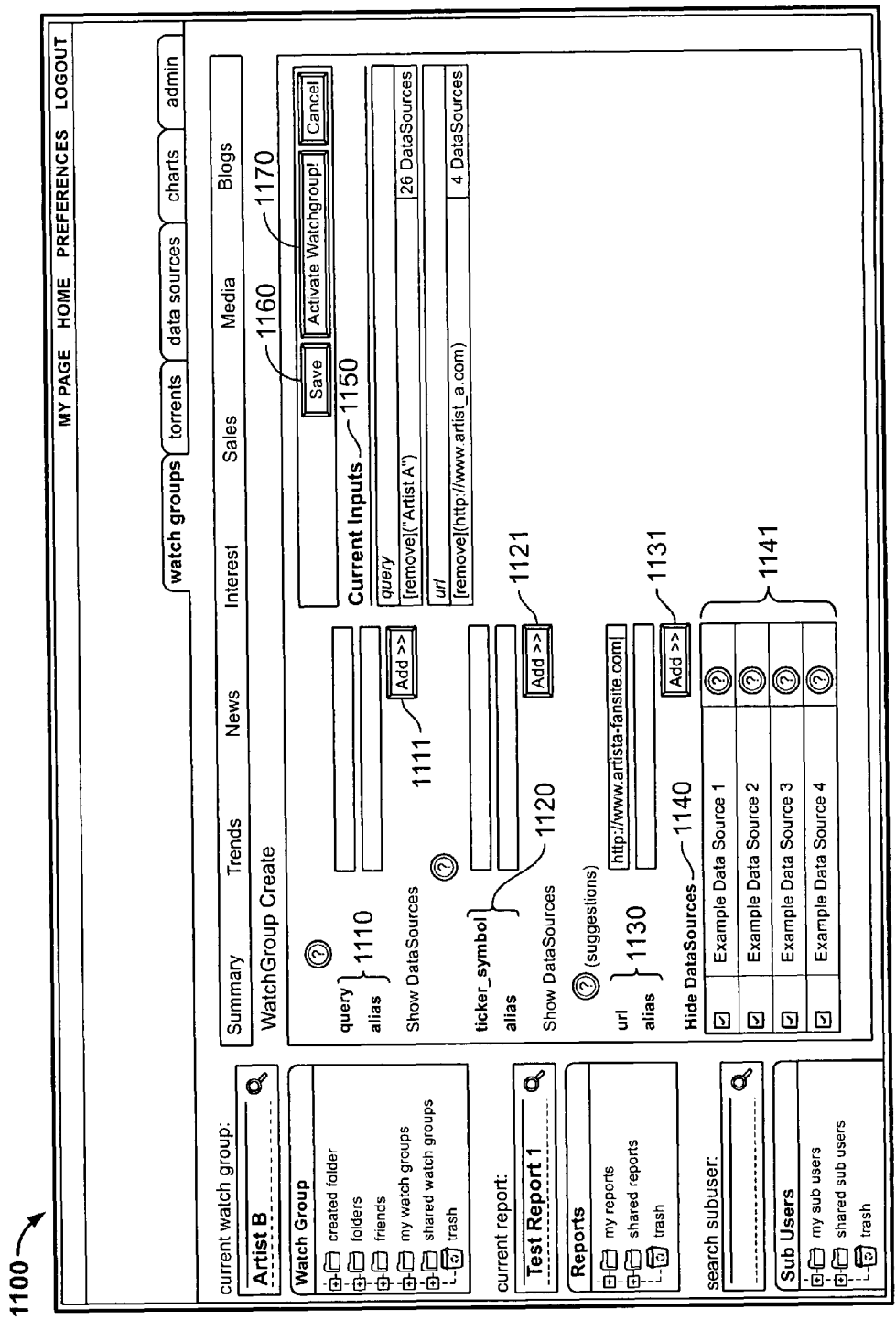
FIG. 11 is an exemplary screenshot of the Watch Group creation webpage displayed by Display/Navigation Module 195 which allows for the configuration of the Data Sources.

In an exemplary embodiment of the present invention, once the User 160 has logged on, the Display/Navigation Module 195 displays various options including but not limited to the option to create a Watch Group. The Watch Group creation process now is described with reference to FIGS. 4, 10 and 11. FIG. 4 is a flow chart detailing the process of creating and configuring a Watch Group in accordance with an exemplary embodiment of the present invention. FIGS. 10 and 11 are exemplary screenshots of the Watch Group creation webpages displayed by the Display/Navigation Module 195. At step 400, the Display/Navigation Module 195 receives a request from the User 160 to create a Watch Group and displays the Watch Group Creation Page 1000, shown in FIG. 10. The User 160 first inputs a Watch Group Name in the Watch Group Name Textfield 1010. The User 160 then selects the Folder where to place the new Watch Group from the Watch Group Folder Picklist 1020. The User 160 then can select which users can have access to the Watch Group from the Watch Group Access Menu 1030. Upon completion, the User 160 can press the "Next" Button 1040 which sends the User's inputted and selected data to the Creation/Activation Module 190.

The Display/Navigation Module 195*b* then displays the Data Source Page 1100 shown in FIG. 1, which allows the User 160 to configure the associated Data Sources and DSIIs (step 410 in FIG. 3) for the Watch Group. In one embodiment of the present invention, the Display/Navigation Module 195*b* displays a predetermined set of Data Sources for the User 160 to select. In an alternate embodiment, the Display/Navigation Module 195*b* displays textfields where the User 160 can input her own Data Source. As a default, the Display/Navigation Module 195*b* assigns all Data Sources to the Watch Group. In an alternate embodiment, the User 160 can select which Data Sources it would like to include in the Watch Group.

As shown in FIG. 11, the User 160 can enter a Query or alias defining additional subjects (DSIIs) to search in the Query Textfield 1110 and add that to the Current Inputs (DSIIs) 1150 for the Watch Group by pressing the Add Button 1111. The Display/Navigation Module 195 will then display the added Query term in the Current Inputs section 1150 which shows the terms that will be searched in the Data Sources associated with the Watch Group. The User 160 also can enter a ticker_symbol or alias to search in the Ticker_Symbol textfields 1120 and add that to the Current Inputs 1150 by pressing the Add 1121 button. The Display/Navigation Module 195 will then display the added Ticker-Symbol in the Current Inputs section 1150. The User 160 additionally can enter a specific URL or alias in the URL Textfield 1130 to be included as one of the Data Sources for the Watch Group by pressing Add button 1131. The Display/Navigation Module 195 then displays the added Data Source in the Current Inputs section 1150. The User 160 can also select or deselect the various default Data Sources by checking or unchecking the Textboxes 1141 next to each Data Source in the Hide Data Sources Section 1140. The User 160 then saves her selection (step 420) by pressing the Save Button 1160.

In an exemplary embodiment, the Display/Navigation Module 195 displays an option for the User 160 to specify various "filters" to be applied to the data retrieved by the DMM Module 175. The "filters" further define the set of DSII data the User 160 would like to include in the monitoring process. For example, if the Display/Navigation Module 195 receives an input that the User 160 only wants to include English-language blog data from a blog site Data Source, the DMM Module 175 only stores English-language blog data in the Database 180. In an exemplary embodiment of the present invention, Display/Navigation Module 195 allows the User 160 to enter specific filters, and in other embodiments Display/Navigation Module 195 allows the User 160 to select from a set of pre-defined or default filters.

If the User 160 decides to save the Watch Group, the Creation/Activation Module 190 then receives the User's Watch Group parameters and creates the Watch Group. The User 160 can select whether to hold the Watch Group inactive or to activate it (step 430) by pressing the Activate Watch Group Button 1170. If the Watch Group is activated, then the Creation/Activation Module 190 makes the Data Source Inputs immediately available to the DMM Module 195 (step 440).

Figure 9:
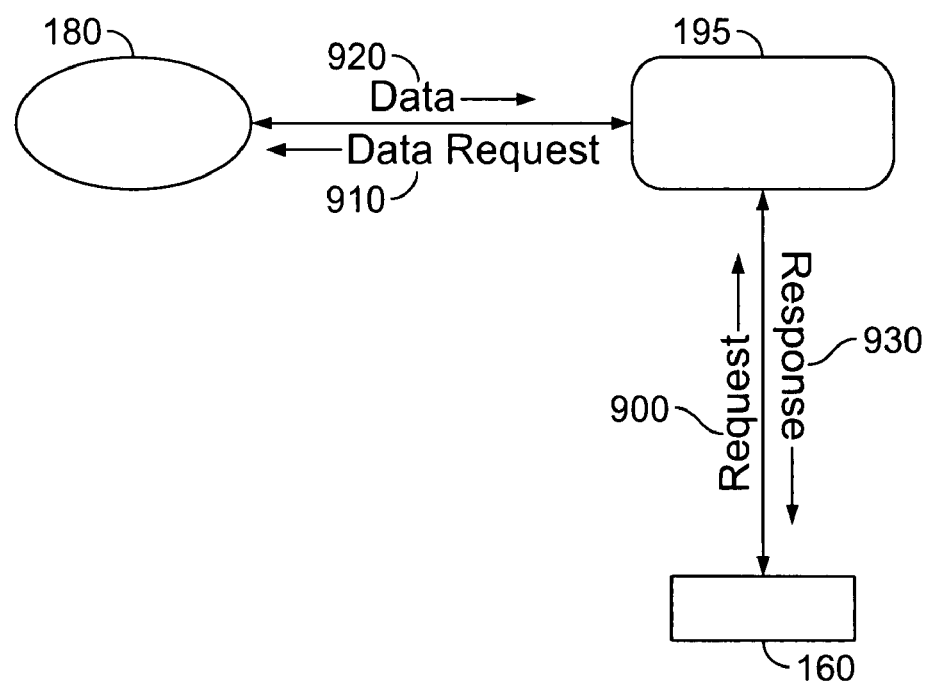
FIG. 9 is a block diagram illustrating the systemic retrieval and provision of data by Display/Navigation Module 195 in accordance with an exemplary embodiment of the present invention.

FIG. 9 is a block diagram illustrating the systemic retrieval and provision of data to the User 160 by the Display/Navigation Module 195 based on the User's elected options at any given time in accordance with an exemplary embodiment of the present invention. When the User 160 makes a request for information (900), the Display/Navigation Module 195 receives the request (900) and queries the Database 180 by making a data request (910) for the necessary information in order to fulfill the User's request (900). The Database 180 then provides the data (920) to the Display/Navigation Module 195 which then processes the data (920) according to the User's request and responds (930) to the User 160 by displaying the requested information in the requested form. For example, if the User 160 requested (step 900) to view graphical data for each Watch Group, the Display/Navigation Module 195 queries the Database 180 for the necessary information at step 910. Database 920 then provides the Display/Navigation Module 195 with the requested information at step 920. The Display/Navigation Module 195 then processes the data in order to display the data in the manner requested by the User 160. The Display/Navigation Module 195 then displays at step 930 to the User 160 graphical data for each Watch Group in the form requested by the User 160. This is one embodiment of the underlying functional process of the Display/Navigation Module 195 retrieval and provision operations. Any and all methods of data retrieval and processing, however, are contemplated by the present invention as would be understood by one of ordinary skill in the art.

Figure 5:
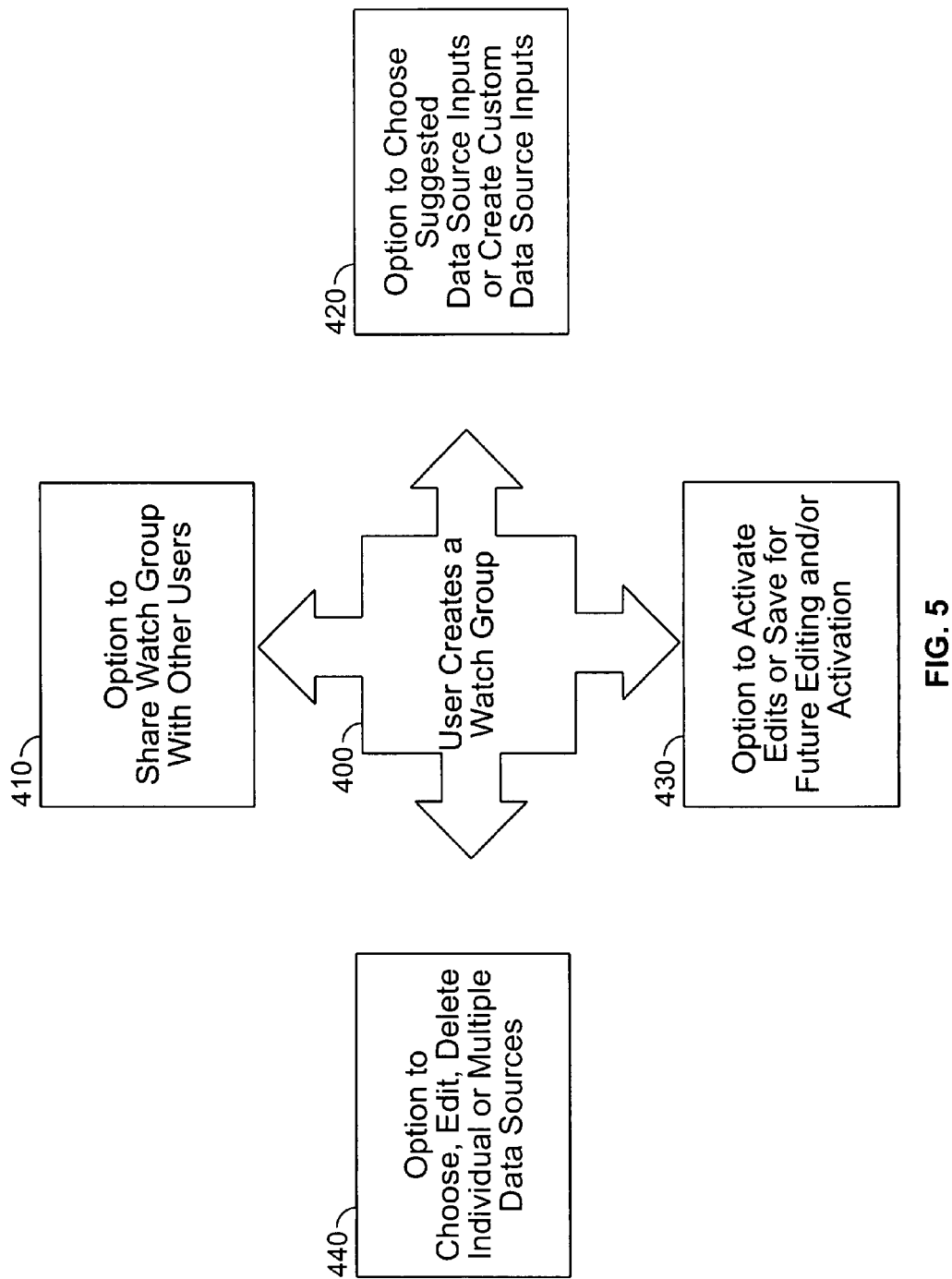
FIG. 5 is a flow chart illustrating Watch Group management options in accordance with an exemplary embodiment of the present invention.

The User 160 can take various options with respect to existing Watch Groups. FIG. 5 is a decision flow chart that illustrates the various options made available to the User 160 and processed by the Display/Navigation Module 195 in accordance with an exemplary embodiment of the present invention. In an exemplary embodiment of the present invention, the Display/Navigation Module 195 displays at least four options to the User 160. Option 410 allows the User 160 to share the Watch Group with other Users. In an exemplary embodiment of the present invention, the Display/Navigation Module 195 can make the Watch Group available to non-Users for example, by sending e-mails of the Watch Group to non-Users specified by the User 160, or the Display/Navigation Module 195 can make the Watch Group available only to other Users of the inventive system specified by the User 160. Any and all methods of making the Watch Group available to sets or subsets of Users are contemplated by the present invention as would be understood by one of ordinary skill in the art.

Option 420 allows the User 160 to add suggested DSIIs to create additional custom DSIIs. In one exemplary embodiment, the Display/Navigation Module 160 can suggest additional DSIIs to the User 160 based on the Watch Group subject matter. The User 160 then selects the additional DSIIs it wishes to associate with the existing Watch Group. As explained above with reference to the creation of a new Watch Group, the User 160 continues to have the opportunity to create and input custom DSIIs with respect to existing Watch Groups. For example, if the Watch Group was for XYZ Inc., Display/Navigation Module may suggest XYZ (the stock ticker). The User 160 could then select XYZ the stock ticker symbol and could also input a customized DSII query such as John Smith, the name of the CEO of XYZ Inc. The Creation/Activation Module 195 would again receive any changes in Watch Group parameters the User saves. The Creation/Activation Module 190 then stores the amended Watch Group parameters in the Database 180 for use by the DMM Module 175.

Option 430 allows the User 160 to activate any edits made to the Watch Group immediately or to save any edits made to the Watch Group for future editing and/or future activation. If the Creation/Activation Module 190 receives instructions from the User 160 to activate the edits made to the Watch Group, the Creation/Activation Module 190 immediately makes the edited version of the Watch Group available to the DMM Module 175 and immediately renders unavailable the unedited version of the Watch Group. If the Creation/Activation Module 190 receives instructions from the User 160 not to activate the edited Watch Group, but instead to save the edited version for future activation, the Creation/Activation Module 195 merely saves the changes but continues to make the prior version of the Watch Group available to the DMM Module 175.

Option 440 allows the User 160 to choose, edit, or delete individual or multiple Data Sources. If the User 160 selects option 440, the Display/Navigation Module 195 allows the User 160 to select a Watch Group and choose, edit, or delete the Data Sources to associate with the Watch Group. The Creation/Activation Module 190 stores any modifications to the Data Sources associated with a particular Watch Group in Database 180 for use by the DMM Module 175.

Figure 6:
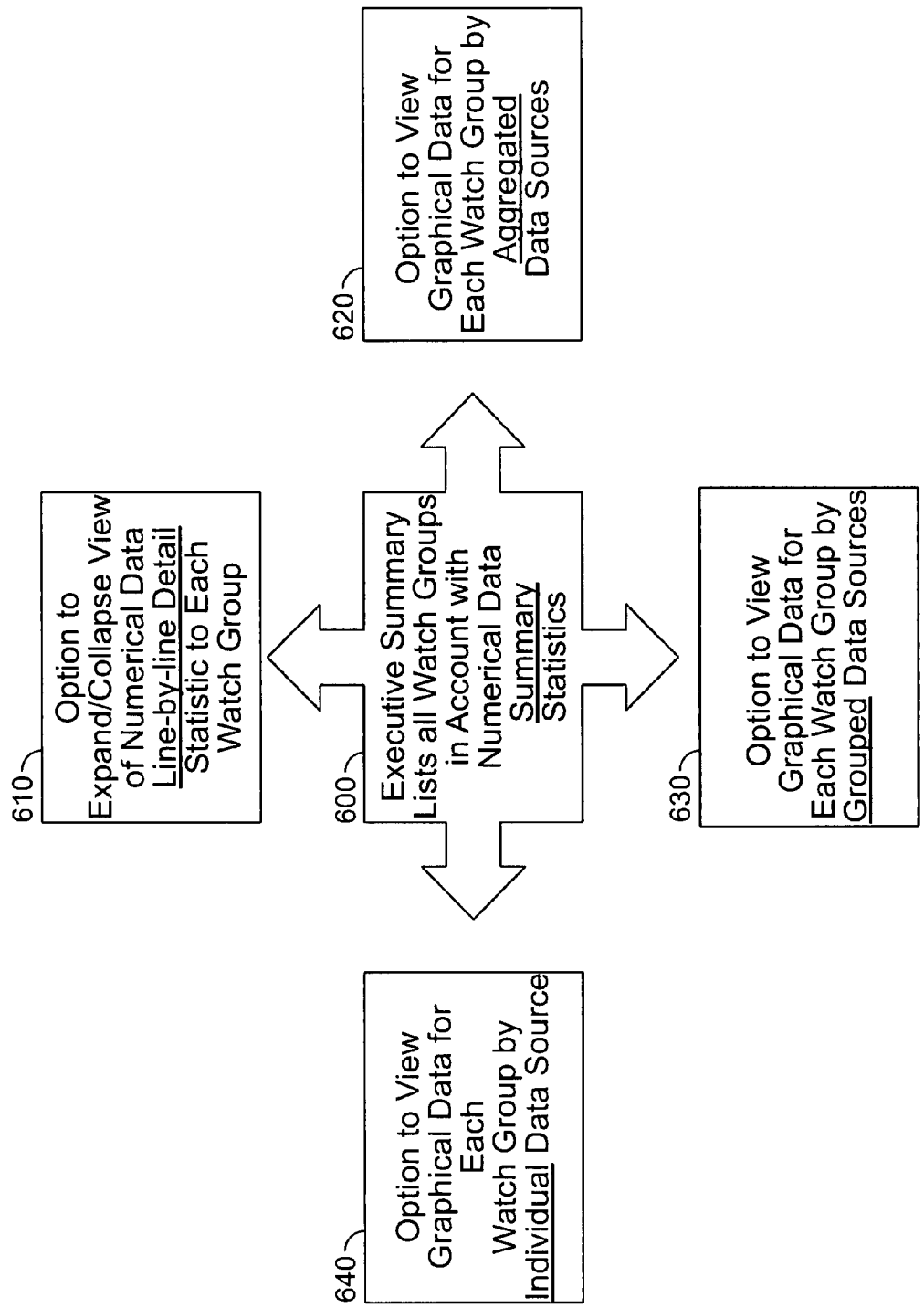
FIG. 6 is a flow chart illustrating Executive Summary management options in accordance with an exemplary embodiment of the present invention.

Once at least one Watch Group has been created and the DMM Module 175 has retrieved and stored information associated with the Watch Group, the Display/Navigation Module 195 displays various options to the User 160 that allow the User 160 to view the Watch Group Data Source Information and compile/export and otherwise manipulate the Watch Group Data Reports. FIG. 6 is a decision flow chart detailing the options available to the User 160 for viewing the Watch Group Data Source information in accordance with an exemplary embodiment of the present invention. If the User 160 elects to view the Watch Group Data Source Information, the Display/Navigation Module 195 displays an Executive Summary to the User 160 which lists all the Watch Groups in the User's account with numerical data summary statistics.

Option 610 allows the User 160 to expand/collapse views of the numerical data presented in the Executive Summary in line-by-line detail statistics for each Watch Group. If the Display/Navigation Module 195 receives instructions from the User 160 to expand, the Display/Navigation Module 195 displays to the User 160 an expanded view of the numerical data statistics for each Watch Group in line-by-line detail. If the Display/Navigation Module 195 then receives instructions from the User 160 to collapse, the Display/Navigation Module 195 displays to the User 160 the collapsed view of the numerical data statistics for each selected Watch Group.

Figure 12:
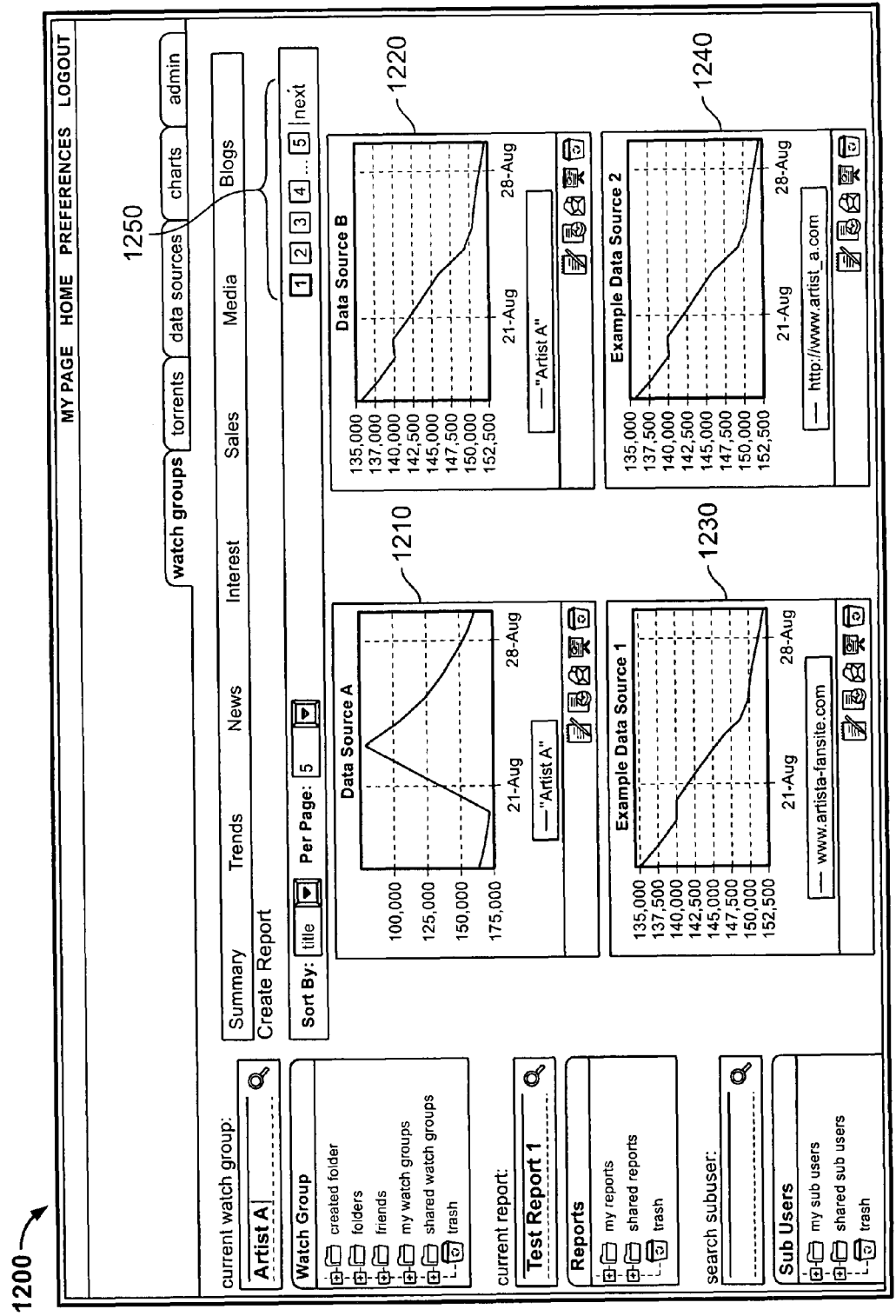
FIG. 12 is an exemplary screenshot of the Watch Group Report Page displaying Watch Group data per Data Source in graphical form.

Option 640 allows the User 160 to view the data in graphical form for each Watch Group by individual Data Source as shown in FIG. 12. If the Display/Navigation Module 195 receives instructions from the User 160 to view the data for each Watch Group in data form per individual Data Source, the Display/Navigation Module 195 displays to the User 160 a graph of each Watch Group showing results based on information from individual Data Sources by querying the data from the Database 180 and generating and displaying the graphs as shown in FIG. 12. FIG. 12 is an exemplary screenshot of the Watch Group Report Page displaying the Watch Group data per Data Source in graphical form. As shown in FIG. 12, Watch Group Report Page 1200 shows four Data Source Graphs 1210-1240 for four of the Data Sources in the Watch Group. The User 160 can press Page Jump Buttons 1-5 and Next 1250 to view additional graphs for the remaining Data Sources associated with the Watch Group.

Option 620 allows the User 160 to view the data in graphical form for each Watch Group by aggregated Data Sources. If the Display/Navigation Module 195 receives instructions from the User 160 to view the data for each Watch Group by aggregated Data Sources, the Display/Navigation Module 195 displays to the User 160 a graph of each Watch Group showing results based on information by aggregated Data Sources associated with that Watch Group by querying the data from the Database 180 and generating and displaying the requested Data Source graph.

Figure 13:
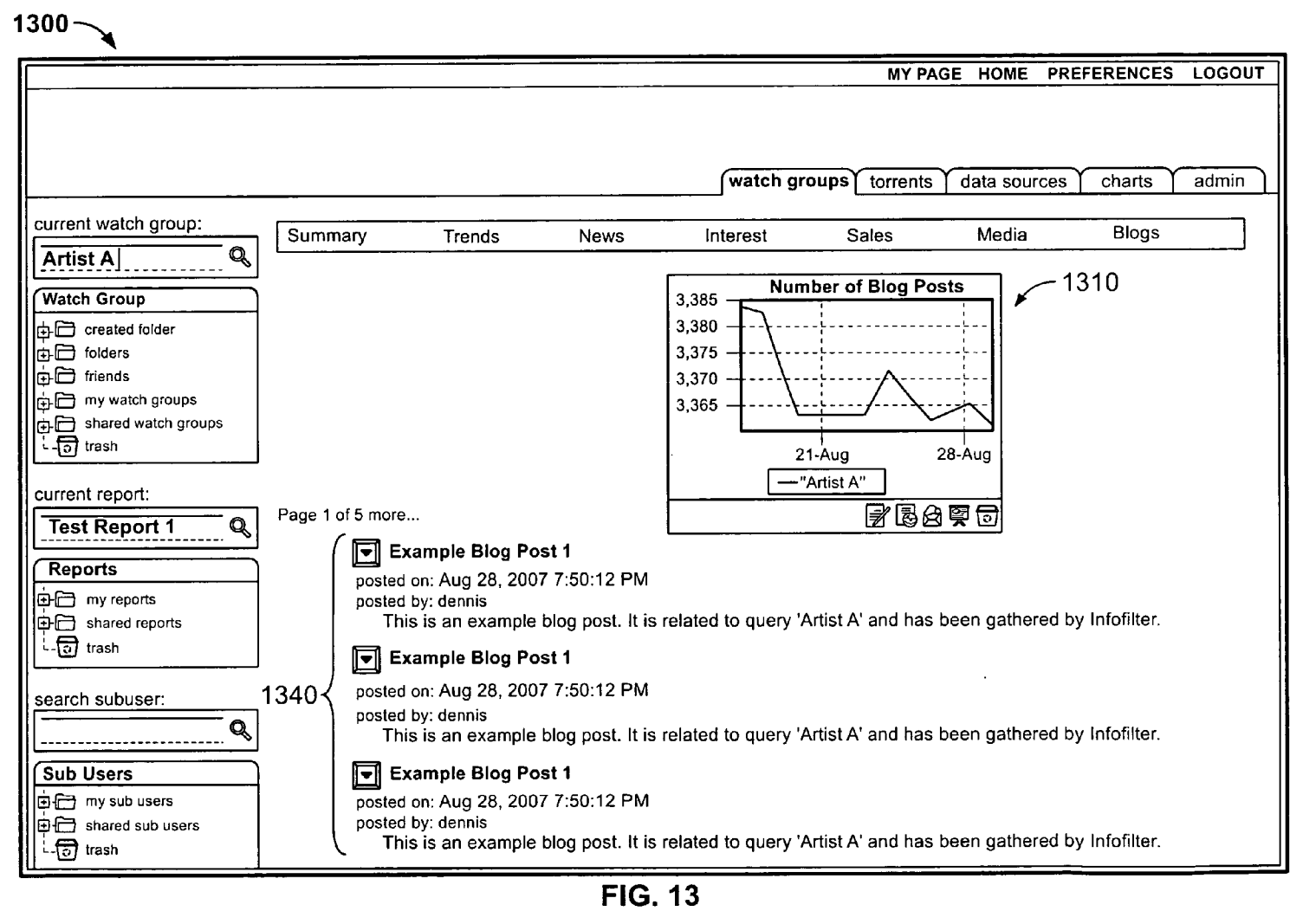

Option 630 allows the User 160 to view the data in graphical form for each Watch Group by grouped Data Sources as shown in FIG. 13. If the Display/Navigation Module 195 receives instructions from the User 160 to view the data for each Watch Group in data form per selected group of Data Sources, the Display/Navigation Module 195 displays to the User 160 a graph of each Watch Group showing results based on information by grouped Data Sources associated with that Watch Group by querying the data from the Database 180 and generating and displaying the requested Data Source graph. FIG. 13 is an exemplary screenshot of the Watch Group Report Page displaying the Watch Group data per Data Source Group in graphical form. As shown in FIG. 13, the Display/Navigation Module 195 displays the Data Reporting Page 1300 in response to the User's 160 query to display a graph for a group the Blog Data Sources for the specified Watch Group. As such, the Display/Navigation Module 195 displays the Blog Group Data Source Graph 1310 which is a graph for the specified Watch Group showing results based on information by grouped "Blog" Data Sources. Also displayed by the Display/Navigation Module 195 on Data Reporting Page 1300 in this exemplary embodiment of the present invention are the most recent Blog Posts 1340 from the group of the Blog Data Sources for the specified Watch Group.

Figure 7:
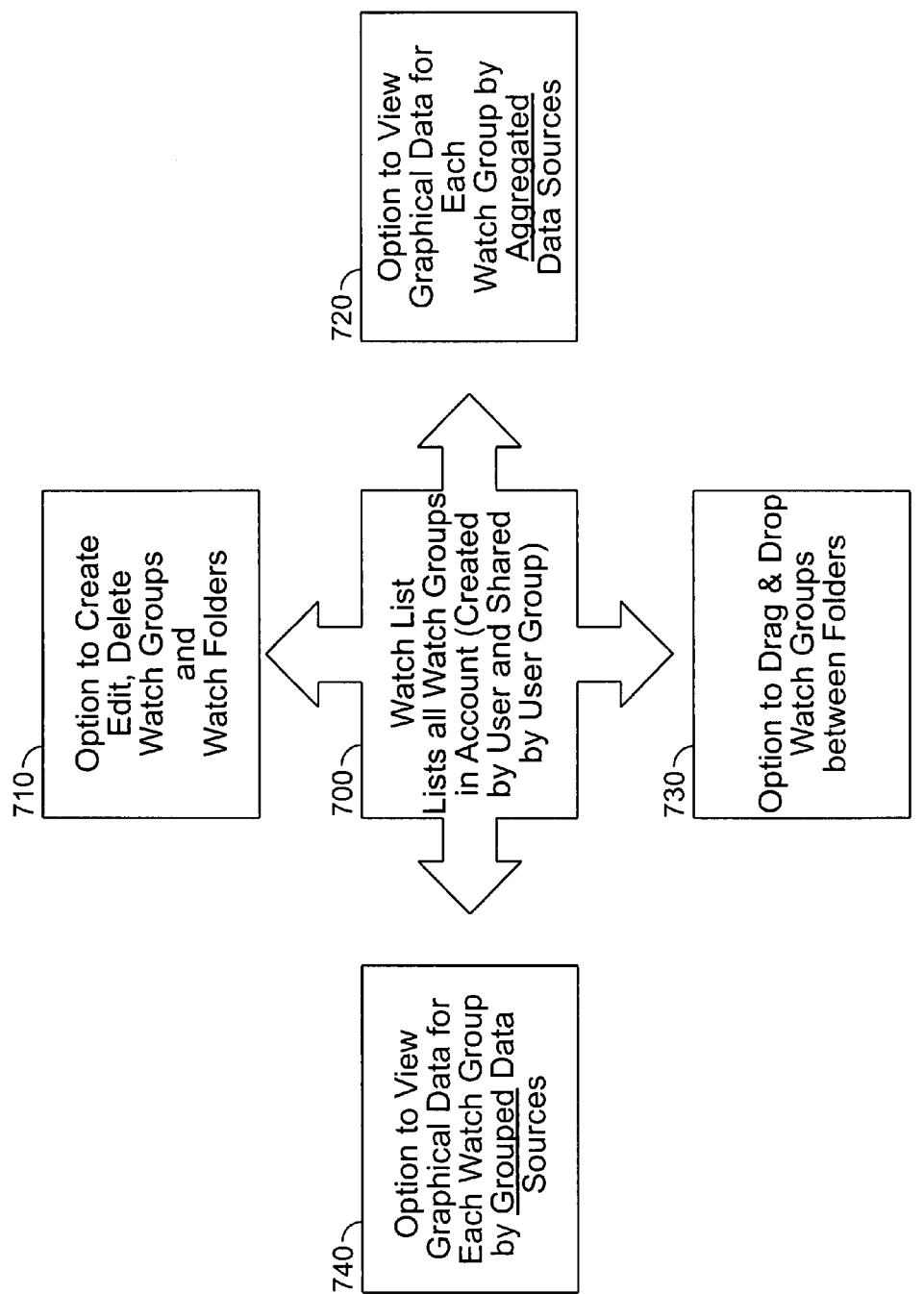
FIG. 7 is a flow chart illustrating Watch List management options in accordance with an exemplary embodiment of the present invention.

In an exemplary embodiment of the present invention, the Display/Navigation Module 195 can display various options for the User 160 to manage a Watch List. A Watch List is essentially a list of all Watch Groups in an account created by the User 160 and/or shared by a group of Users. FIG. 7 is a decision flow chart detailing the options available to the User 160 for managing the Watch Lists in accordance with an exemplary embodiment of the present invention. The Display/Navigation Module 195 allows the User 160 to create, edit, delete, Watch Groups and Watch Folders at option 710. A Watch Folder is a folder of various Watch Groups that are grouped together by the User 160. Option 730 allows the User 160 to drag and drop Watch Groups between Watch Folders.

Option 720 allows the User 160 to view the data in the entire Watch Folder in graphical form for each Watch Group by aggregated Data Sources. If the Display/Navigation Module 195 receives instructions from the User 160 to view the data for the Watch Folder in data form for aggregated Data Sources, the Display/Navigation Module 195 displays to the User 160 a graph of Watch Groups in the Watch Folder showing results based on information aggregated from all Data Sources associated with the Watch Groups in the Watch Folder by querying the data from the Database 180 and generating and displaying the graph.

Option 740 allows the User 160 to view the data in the entire Watch Folder in graphical form for each Watch Group in the Watch Folder by grouped Data Sources. If the Display/Navigation Module 195 receives instructions from the User 160 to view the data for the Watch Folder in data form for grouped Data Sources, Display/Navigation Module 195 displays to the User 160 a graph of Watch Groups in the Watch Folder showing results based on information from grouped Data Sources associated with the Watch Groups in the Watch Folder by querying the data from the Database 180 and generating and displaying the graph.

Figure 8:
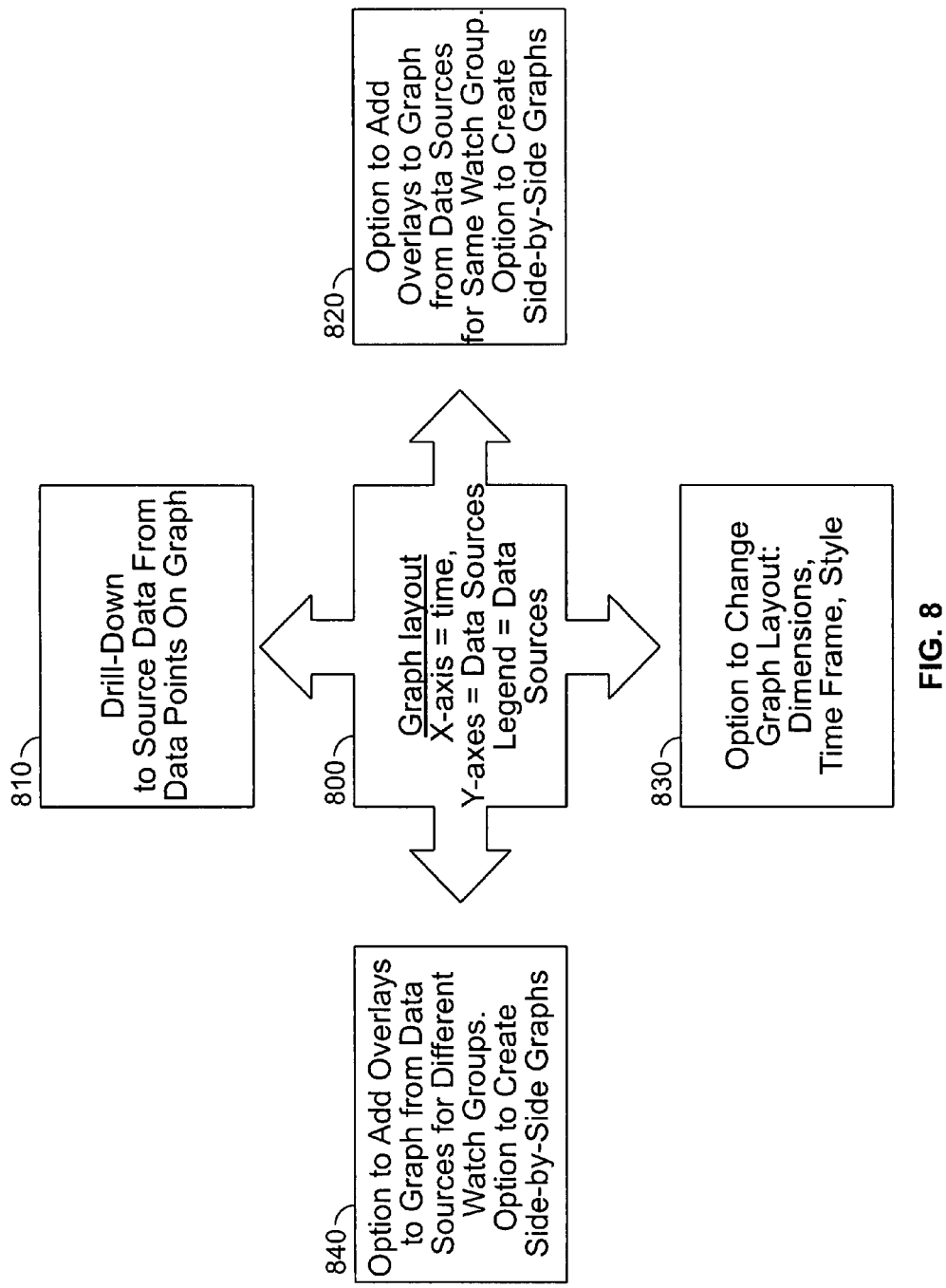
FIG. 8 is a flow chart illustrating graph viewing options in accordance with an exemplary embodiment of the present invention.

In a further exemplary embodiment of the present invention, the Display/Navigation Module 195 displays various options to the User 160 for modifying various graph layouts. FIG. 8 is a decision flow chart detailing the options available to the User 160 for modifying the graph layout displayed by the Display/Navigation Module 195 in accordance with an exemplary embodiment of the present invention. If the Display/Navigation Module 195 receives instructions from the User 160 to generate a graph, at step 800 the Display/Navigation Module 195 generates a graph based on the User 160 Data Source election according to the defaulted parameters where the X-axis is the time, the Y-axis is the Data Source(s) and the Legend shows the Data Source(s).

Option 810 allows the User 160 to drill down to the actual Data Source data from any data point on the graph. If the Display/Navigation Module 195 receives instructions from the User 160 to drill down to the data underlying the selected data point, the Display/Navigation Module 195 queries the Database 180 for the underlying data and then displays to the User 160 the actual data underlying the data point either in a pop-up window or page or by any other display means as would be understood by those of skill in the art.

Option 820 allows the User 160 to add overlays to graphs from Data Sources for the same Watch Group or to create side-by-side graphs illustrating data from different Data Sources from the same Watch Group. If the Display/Navigation Module 195 receives instructions from the User 160 to overlay graphs from various Data Sources, the Display/Navigation Module 195 generates and displays one graph with data from different Data Sources either combined as one set of data or showing the data from the two different Data Sources on the same graph with each Data Source identified in the graph. If the Display/Navigation Module 195 receives instructions to create side-by-side graphs, the Display/Navigation Module 195 generates and display multiple graphs (depending on the number of selected Data Sources) that each show the data from each Data Source individually in a Watch Group.

Option 830 allows the User 160 to change the general graph layout dimensions of time, frame, and style. If the Display/Navigation Module 195 receives instructions from the User 160 to modify the graph layout, the Display/Navigation Module 195 displays an Edit Page which allows User 160 to input the changes to the various graph layout parameters. When the Display/Navigation Module 195 receives the inputted changed parameters, it stores the changes in the Database 160 and will then generate all graphs or specified graphs according to the graph layout parameters.

Option 840 allows the User 160 to add overlays to graphs from Data Sources for different Watch Groups or to create side-by-side graphs illustrating data from different Data Sources from different Watch Groups. If the Display/Navigation Module 195 receives instructions from the User 160 to overlay graphs from various Data Sources, the Display/Navigation Module 195 generates and displays one graph with data from different Data Sources either combined as one set of data or showing the data from the two different Data Sources on the same graph identified by Data Source. If the Display/Navigation Module 195 receives instructions to create side-by-side graphs, the Display/Navigation Module 195 generates and displays multiple graphs (depending on the number of selected Data Sources) that each show the data from each Data Source individually. In alternate embodiments, more or less options for can be provided as would be understood by one of ordinary skill in the art.

While the present invention has been particularly described with respect to the illustrated embodiment, it will be appreciated that various alterations, modifications and adaptations may be made based on the present disclosure, and are intended to be within the scope of the present invention. Therefore, the spirit and scope of the appended claims should not be limited to the description of the embodiments herein.

What is claimed is:

1. A system for collecting and processing data over a communications network, comprising:
a processor based web server comprising:
a plurality of plugins stored in the server, each configured to retrieve unstructured data from a data source on behalf of a plurality of users over said communications network and to convert said unstructured data by parsing said unstructured data into structured data comprising historical data, updated data and analytical graphical representation of said data;
an activation module for receiving each user's selection of one or more data items relating to a subject matter to be monitored from a client device associated with said each user over said communications network; and
a data mining marshaller (DMM) module for associating a plugin to each data item selected by said plurality of users, associating said plugin to an associated data source, associating said plugin to each user who have selected same associated data item to be monitored, and managing each plugin to periodically retrieve said unstructured data from said associated data source based on said associated data item to be monitored on behalf of the users who have selected said associated data item to be monitored to enable multiple users to share said structured data based on shared interest in same subject matter; and
a database to store said structured data received from said plurality of plugins.

2. The system of claim 1, wherein said DMM module of said processor based web server associates said each plugin with one of a plurality of data sources defined by said plurality of users.

3. The system of claim 1, wherein said each data source is accessed by a plugin associated with said each data source.

4. The system of claim 1, wherein said DMM module of said processor based web server determines if a data item needs to be updated; and to manage a plugin associated with said data item to update said data item.

5. The system of claim 4, wherein said DMM module of said processor based web server loads and launches said plugin associated with said data item to retrieve said unstructured data in response to said data item to be monitored.

6. The system of claim 1, wherein said each plugin further comprises a filter module for filtering said unstructured data in response to a plurality of data item parameters.

7. The system of claim 6, wherein said filter module is operable to filter said unstructured data in response to one or more data item parameters received from said plurality of users.

8. The system of claim 1, wherein said DMM module further comprises a filter module for filtering said structured data in response to a plurality of data item parameters.

9. The system of claim 1, wherein said processor based web server further comprises a display navigation module to display said stored structured data received in response to a data item associated with a user.

10. The system of claim 9, wherein said display navigation module of said processor based web server displays said stored structured data in a plurality of graphical representations selectable by said user.

11. The system of claim 9, wherein said display navigation module of said processor based web server displays said structured data in one or more following graphical representations: displaying said structured data related to one data item associated with said user, displaying structured data related to two or more data items associated with said user; displaying structured data associated with said user from a single data source; and displaying structured data associated said user from multiple data sources.

12. The system of claim 11, wherein said activation module generates a watch group by said user, said watch group comprising one or more data items relating to the subject matter, said associated data sources and said graphical representations of said structured data.

13. The system of claim 12, wherein said activation module is operable to enable said user to share said watch group with another user.

14. The system of claim 12, further comprising a processor based user device to access said DMM module of said processor based web server; and wherein said display navigation module of said processor based web server displays said structured data on said processor based user device.

15. A non-transitory computer-readable medium comprising a code for collecting and processing data over a communications network, said code comprising instructions for:
configuring a plurality of plugins stored in processor based server, each plugin configured to retrieve unstructured data from a data source over said communications network and to convert said unstructured data by parsing said unstructured data into structured data comprising historical data, updated data and analytical graphical representation of said data;
receiving each user's selection of one or more data items relating to a subject matter to be monitored from a client device associated with said each user over said communications network;
associating a plugin to each data item selected by said plurality of users;
associating said plugin to an associated data source;
associating said plugin to each user who have selected same associated data item to be monitored;
managing each plugin to periodically retrieve said unstructured data from said associated data source based on said associated data item to be monitored on behalf of the users who have selected said associated data item to be monitored to enable multiple users to share said structured data based on shared interest in same subject matter; and
storing said structured data received from said plurality of plugins in a database.

16. A computer based method for collecting and processing data over a communications network, comprising the steps of:
configuring a plurality of plugins stored in a processor based server, each plugin configured to retrieve unstructured data from a data source over said communications network and to convert said unstructured data by parsing said unstructured data into structured data comprising historical data, updated data and analytical graphical representation of said data;
receiving each user's selection of one or more data items relating to a subject matter to be monitored from a client device associated with said each user over said communications network;
associating a plugin to each data item selected by said plurality of users;
associating said plugin to an associated data source;
associating said plugin to each user who have selected same associated data item to be monitored;
managing each plugin to periodically retrieve said unstructured data from said associated data source based on said associated data item to be monitored on behalf of the users who have selected said associated data item to be monitored to enable multiple users to share said structured data based on shared interest in same subject matter; and
storing said structured data received from said plurality of plugins in a database.

17. The computer based method of claim 16, wherein said step of associating said each plugin to said data source further comprises associating said each plugin with one of a plurality of data sources defined by said plurality of users.

18. The computer based method of claim 16, wherein said step of managing said each plugin further comprises managing said each plugin to access a data source.

19. The computer based method of claim 16, further comprising the step of determining if said data item needs to be updated; and managing a plugin associated with said data item to update said data item.

20. The computer based method of claim 16, further comprising loading and launching said plugin associated with said data item; and retrieving said unstructured data in response to said data item to be monitored.

21. The computer based method of claim 16, further comprising filtering said unstructured data in response to a plurality of data item parameters.

22. The computer based method of claims 21, wherein the filtering step further comprises the step of filtering said unstructured data in response to one or more data item parameters received from said plurality of users.

23. The computer based method of claim 16, further comprising the step of filtering said structured data in response to a plurality of data item parameters.

24. The computer based method of claim 16, further comprising the step of displaying said stored structured data received in response to said data item associated with a user.

25. The computer based method of claim 24, further comprising the step of displaying said stored structured data in a plurality of graphical representations selectable by said user.

26. The computer based method claim 24, wherein the step of displaying said stored structure further comprises the step of displaying said structured data in one or more of the following graphical representations: displaying said structured data related to one data item associated with said user, displaying structured data related to two or more data items associated with said user; displaying structured data associated with said user from a single data source; displaying structured data associated said user from multiple data sources.

27. The computer based method of claim 16, further comprising the step of generating a watch group by a user, said watch group comprising one or more data items relating to the subject matter; said associated data sources; and said graphical representations of said structured data.

28. The computer based method of claim 27, wherein the step of generating a watch group further comprises enabling said user to share said watch group with another user.

* * * * *